United States Patent [19]
Tong et al.

[11] Patent Number: 5,248,916
[45] Date of Patent: Sep. 28, 1993

[54] CHLORINATED SILANE AND ALKOXYSILANE COATINGS FOR CATHODE RAY TUBES

[75] Inventors: Hua-Sou Tong, Arlington Heights; Gregory Prando, Chicago, both of Ill.

[73] Assignee: Zenith Electronics Corporation, Glenview, Ill.

[21] Appl. No.: 771,074

[22] Filed: Oct. 2, 1991

[51] Int. Cl.[5] .............................................. H01J 31/00
[52] U.S. Cl. .................................... 313/478; 313/479; 427/64; 427/387; 427/110
[58] Field of Search ................... 313/479, 478; 427/64, 427/66, 387, 110

[56] References Cited
U.S. PATENT DOCUMENTS

| | | |
|---|---|---|
| 3,689,312 | 9/1972 | Long et al. ............................ 117/94 |
| 4,563,612 | 1/1986 | Deal et al. ........................... 313/478 |
| 4,582,761 | 4/1986 | Liu ...................................... 428/442 |
| 4,945,282 | 7/1990 | Kawamura et al. ................. 313/479 |
| 5,153,481 | 10/1992 | Matsuda et al. ................. 359/885 X |

Primary Examiner—Michael Lusignan

[57] ABSTRACT

The present invention is directed to a cathode ray tube (CRT) having a surface with improved antistatic and antiglare properties and to a method for providing such improved properties. In the method of the invention, a solution of a silane selected from a chlorinated silane and an alkoxysilane in a solvent system of on alcohol and chloride ion is provided. The solution is applied to the surface of a cathode ray tube to impart antiglare and antistatic properties to the surface. Thereafter, the CRT with the silane applied is cured at an elevated temperature for a period of time sufficient to cause the silane to react and be converted to a siloxane.

34 Claims, 1 Drawing Sheet

CHLORINATED SILANE AND ALKOXYSILANE COATINGS FOR CATHODE RAY TUBES

FIELD OF THE INVENTION

The present invention relates generally to a cathode ray tube (CRT) having a coating on the face panel thereof which provides antiglare and antistatic properties. More particularly, the present invention relates to a method for providing an antiglare and antistatic coating on the face panel of CRT's.

BACKGROUND OF THE INVENTION

Cathode ray tubes are increasingly being used as visual display terminals (VDT's) which are scanned at close range by the human eye. It is desirable to minimize the glare that is reflected from the glass surface of the CRT so as to enable the user to more easily read the graphics and other display characters that are shown on the screen.

Various methods are known for reducing the glare on CRT face panels. U.S. Pat. No. 4,945,282 to Kawamura describes a process for providing antistatic and antiglare properties to the surface of a CRT. The process involves applying a suspension of electroconductive metal oxide particles in an alcoholic solution of alkoxysilane onto the front surface of a CRT. This is followed by heat treatment to the resulting coat to form an antistatic film comprising a transparent electroconductive $SiO_2$ coat on the front surface. Antiglare properties are provided by applying a second non-glare film over the electroconductive $SiO_2$ coat. The formulation of the non-glare film includes the steps of dispersing fine $SiO_2$ particles in an alcoholic solution of alkoxysilane, applying the suspension over the antistatic film which is the transparent substrate formed on the panel and heating the resultant coat to decompose the alkoxysilane to form a thin $SiO_2$ film to thereby cover and fix the fine $SiO_2$ particles.

U.S. Pat. No. 4,563,612 to Deal, et al. describes a cathode ray tube having an antistatic, glare-reducing coating. The coating has a rough surface which is composed essentially of a silicate material and an inorganic metallic compound. The coating is applied by spraying a solution of a water soluble salt of one or more of a metal selected from platinum, tin, palladium and gold in a lithium stabilized silica sol onto the surface of the cathode ray tube. A solution of lithium, sodium and potassium silicate or an organic silicate, such as tetraethyl orthosilicate may be substituted for the lithium stabilized silica sol.

U.S. Pat. No. 4,582,761 to Liu discloses an aqueous dispersion of polyvinyl acetate for use as a coating on an electronic viewing screen to provide antiglare properties.

U.S. Pat. No. 3,689,312 to Long, et al. is directed to a method for producing a glare-reducing coating on the surface of a cathode ray tube. The method includes the steps of preparing a coating formulation consisting of a solution of a siliceous polymer and an organic polymer in a volatile organic liquid vehicle for the polymers. The solution is then sprayed onto the surface of a cathode ray tube to coat the surface. The cathode ray tube is then baked at a temperature of 100° C. to 200° C. to cure the coating.

A cathode ray tube having an antistatic film is disclosed in U.S. Pat. No. 4,785,227 to Matsuda, et al. The antistatic film is applied by dipping the cathode ray tube into a mixture of tetraethyl silicate, propanol and butanol containing a colloidal solution of metal particles.

It is known to apply a solution of tetrachlorosilane in an anhydrous alcohol to the surface of a CRT heated to 50° C. to 80° C. to reduce glare. The tube surface is then heated to a temperature up to 200° C. for 15-20 minutes to cause polymerization of the silane to a polysiloxane. In this method, the silane solution is sprayed onto the surface of the CRT in the form of discrete island droplets of the solution. A continuous film of the solution must be avoided to provide optimum antiglare properties.

It is also known to apply coatings of lithium silicate onto the surface of a CRT to provide antiglare properties.

While various prior art methods have been proposed for reducing gloss and providing antiglare properties to the surface of a CRT, such methods have not met with complete success. It is important that any coating provided on the surface of the CRT to reduce gloss does not impart undesirable side effects, such as the provision of a mottled or uneven surface. The diffusive reflectivity of the surface imparted by the coating should also not be substantially different than that of the uncoated CRT.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the FIGURES of which like reference numerals identify like elements, and in which:

DESCRIPTION OF THE PREFERRED EMBODIMENT

The invention is useful in cathode ray tubes of various types including home entertainment and medium-resolution and high-resolution types for use in color monitors.

Figure 1:
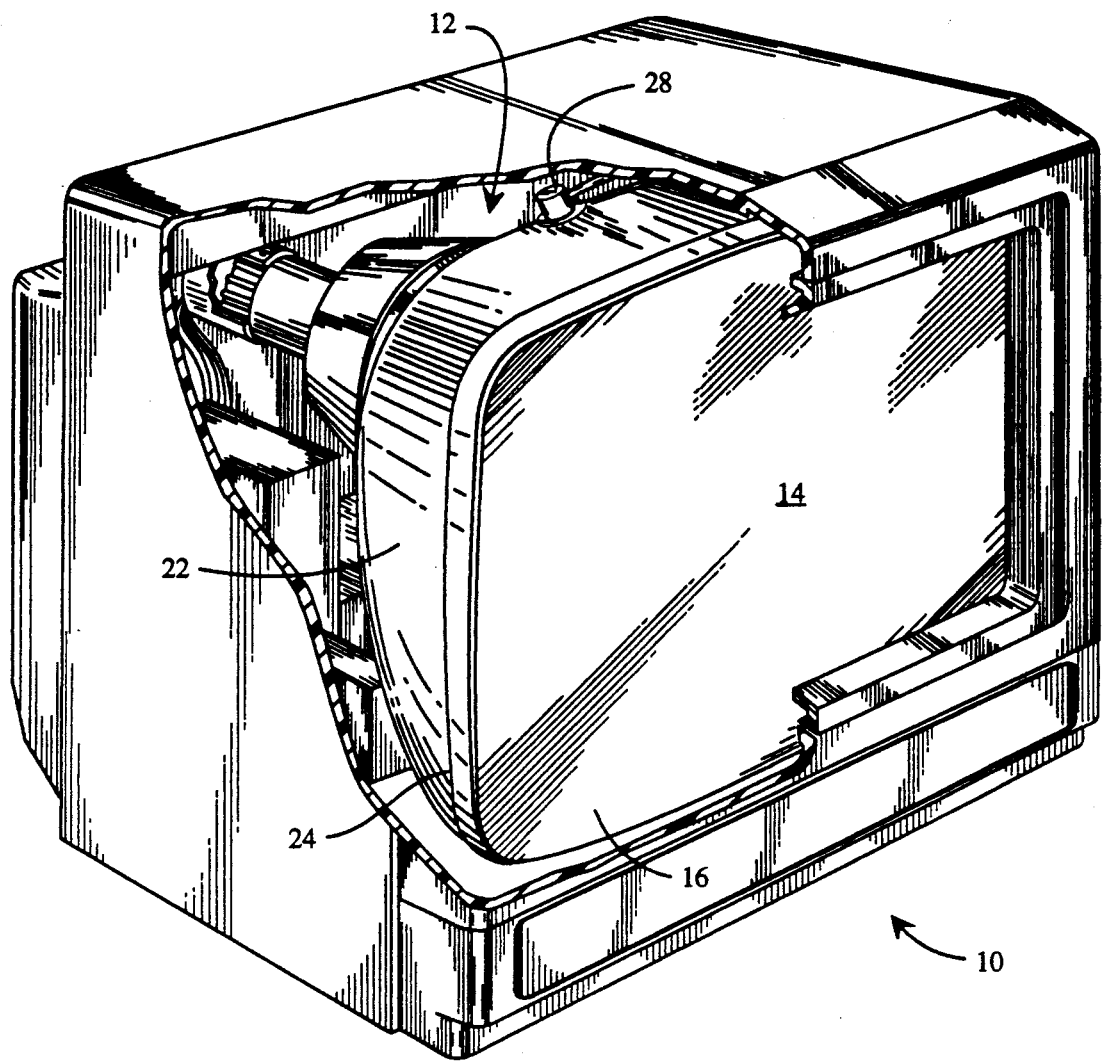
FIG. 1 is a cut-away view in perspective of a cabinet that houses a color cathode ray tube, showing certain components, including a front panel, which are the subject of the present invention.

FIG. 1 shows a novel video monitor 10 that houses a color cathode ray tube 12 having a front panel assembly according to the invention. The design of the video monitor is the subject of copending Design patent application Ser. No. 725,040 of common ownership herewith, now abandoned. The monitor, and the associated tube according to the invention, is notable for the flat imaging area 14 that makes possible the display of images in undistorted form. Imaging area 14 also offers a more efficient use of screen area as the corners are relatively square in comparison with the more rounded corners of the conventional cathode ray tube. The front assembly system comprises the components described in the following paragraphs.

A funnel 22 is shown as being attached to a peripheral sealing area 24 on the inner surface of faceplate 16. A high electrical potential is applied through a high voltage conductor (not shown) attached to an anode button 28 which conducts the potential (the source of which is a high voltage power supply) through the wall of the funnel 22. The potential may be in the range of 18 to 32 kilovolts, by way of example.

Figure 2:
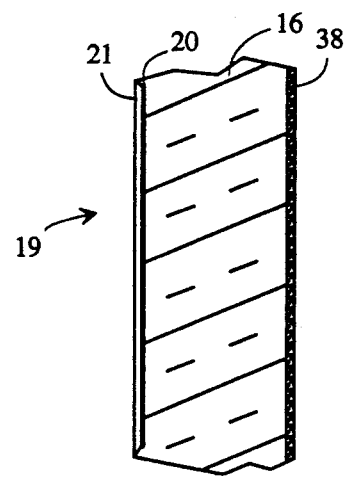
FIG. 2 is a cross-sectional view, broken away, of the front panel of the cathode ray tube of FIG. 1.

With reference also to FIG. 2, the imaging area 14 includes a glass face panel 16 that may be flat, or alternatively, "substantially flat" in that it may have finite horizontal or vertical radii, by way of example. Face panel 16 is represented as having on its inner surface a centrally disposed electron beam target area 19 on which is disposed at least one pattern of phosphor deposits 20. An electrically conductive screen 21 is depicted schematically as being deposited on and overlaying the pattern of phosphor deposits 20. The electrically conductive screen 21 comprises a film of highly reflective, electrically conductive aluminum disposed on the pattern of phosphor deposits 20 by evaporative means or by hot stamping and having a thickness of about 2000 Angstroms. The novel antiglare-antistatic coating 38 of the invention is formed on the outer surface.

Generally in accordance with the present invention, a solution of a silane selected from chlorinated silanes and alkoxysilanes in a solvent system comprising an alcohol and chloride ion is applied to the surface of a cathode ray tube (CRT) to impart antistatic and antiglare properties to the surface of the CRT. The CRT with the silane applied is then cured at an elevated temperature to cause the silane to react in the environment of the solution and to be converted to an adhering coating of a siloxane.

The surface of the CRT is first cleaned with a suitable cleaning agent. Suitable cleaning agents include commercial glass detergent, such as 409 TM, manufactured by The Clorox Co. and Windex TM, manufactured by Drackett Products Co. In one embodiment of the invention, a two-step cleaning process is used to assure adherence of the silane solution. In the first step, the surface of the CRT is rubbed with a suitable particulate substance having a fine particle size in the range of from about 3 to about 12 microns. Suitable particulate substances are metal oxides such as cerium oxide or alumina; volcanic glasses, such as pumice; and friable silicon materials, such as rottenstone. The CRT is then rinsed with water. In the second step, the CRT is cleaned by the application of a commercial glass detergent and is again rinsed with water. The CRT is then dried in air, preferably the use of compressed air.

Suitable silanes include chlorinated silanes, such as tetrachlorosilane and trichlorosilane, and alkoxysilanes such as tetraethoxysilane. For the chlorinated silanes, the chloride ion in the solvent system is provided by decomposition of the chlorinated silane in alcohol. When tetraethoxysilane is used, chloride ion is providing by adding hydrochloric acid to the alcohol. The chloride ion is present in the solvent system at a level of from about 0.01 to about 1.3 mols of chloride ion per 100 grams of solution. The silane is preferably present in the solution at a level of from about 0.5 percent to about 50 percent by weight, based on the weight of the alcohol. All percentages used herein are by weight, unless otherwise indicated.

The alcohol for use in the solvent system of the present invention is an aliphatic $C_1$-$C_4$ alcohol. Preferred alcohols are selected from the group consisting of ethanol, propanol and butanol. A particularly preferred alcohol is ethanol.

The silane solution is applied to the surface of the cathode ray tube by spraying a fine mist of the solution onto the surface. The surface of the cathode ray tube is preheated prior to the application of the solution to initiate the chemical reaction, which will form silane particles on the surface of panels. The preheated surface also helps to evaporate the alcohol and water and prevents running of the solution. The surface of the cathode ray tube is preferably preheated to a temperature of from about 90° C. to about 120° C. The fine mist of the silane solution is applied so as to form a plurality of discrete droplets uniformly over the surface of the CRT.

In the method of the invention, it is important that the solution drops which are sprayed onto the surface of the CRT have a particle size in the range of from about 0.3 to about 0.5 microns at the point of arrival at the surface of the CRT. The desired solution drop size can be attained by use of a compressed air spray gun having a fluid nozzle orifice of from about 0.05 to about 0.13 cm and which is operated at an air pressure of 30-60 psig, a fluid pressure of 5-15 psig and a distance of spray gun to CRT surface of 18-25 cm. The solution is preferably applied to the surface of the cathode ray tube at a level sufficient to provide from about 0.3 to about 1.2 milligrams of the silane per square centimeter of the surface area.

A single pass of a spray gun over the surface of the front panel of the cathode ray tube may not result in the application of the desired amount of the solution of the silane. The solution may be applied in multiple layers such as by repeatedly passing a spray gun over the surface of the cathode ray tube. The cathode ray tube is preferably preheated to a temperature in the range of from about 90° C. to about 120° C. prior to the first spray pass and the remaining spray passes are made prior to any substantial cooling of the surface. In an important embodiment of the invention, from about 3 to about 12 spray passes of the solution are applied.

After the solution of silane is applied, the cathode ray tube may be cured at an elevated temperature for a period of time sufficient to convert the silane to siloxane. Suitable temperature and time conditions are a temperature of from about 120° C. to about 200° C. for a period of from about 0.1 hour to about 2 hours. Curing at an elevated temperature is not essential and curing may be effected at ambient temperature.

The following examples further illustrate various features of the present invention, but are intended to in no way limit the scope of the invention which is defined in the appended claims.

EXAMPLE 1

A solution of tetrachlorosilane was prepared having the following components at the indicated levels.

| Component | Weight Percent |
| --- | --- |
| Ethanol | 97 |
| Tetrachlorosilane | 3 |

A CRT was cleaned by buffing with a buffing compound, which is a uniform paste having 1 part by weight of cerium oxide having a particle size in the range of 3 to 12 microns, 1 part by weight of Syloid 244 (Davidson), 1 part by weight mineral spirits, 1 part by weight methylene chloride and 1 part by weight xylene. This is followed by rinsing with tap water, cleaning with a commercial glass detergent (Windex TM manufactured by Drackett Products Co., Cincinnati, Ohio), rinsing again with tap water and drying by directing a stream of compressed air over the surface of the CRT.

The above silane solution was sprayed onto the panel surface of cleaned cathode ray tubes which had been preheated to a temperature of 90° C. The solvent and water were flashed from the surface of the face panel to provide a coating of silane. Spraying was accomplished by use of a compressed air spray gun having a nozzle orifice of 0.07 cm, and operated at an air pressure of 50 psig and a fluid pressure of 10 psig. The spray gun was moved back and forth over the surface of the CRT from a distance of 21 cm. Five passes of the spray gun were used to deposit a coating of 0.5 mg of silane per cm² of surface area. The cathode ray tubes were then cured at a temperature of 150° C., 175° C., 200° C. or 225° C. for a period of twenty minutes. The resulting coating was a thin layer of silicon oxide. The gloss reduction of the face panel without coating wa 92%. After coating with the coating composition of the invention, the gloss reduction was 56%.

An important function of the method of the present invention is to provide antistatic properties for a CRT surface. CRT's having the above silane composition applied thereto, were tested for antistatic properties using an electrostatic meter. For this test, the CRT was turned on, which immediately imparted a 25 KeV charge on the surface of the tube. The meter was held two inches from the surface of the tube. While the CRT remained on the CRT surface was grounded and the time in second for the surface charge to decay was measured. The ground was then removed and the CRT was turned off. The time in second for the charge to decay was again measured. The results for several runs are set forth below in Tables 1–4.

TABLE 1

| | CURING AT 150° C. FOR 20 MINUTES | | | | | | | | | | | | | |
|---|---|---|---|---|---|---|---|---|---|---|---|---|---|---|
| | ON | | | | | | | OFF | | | | | | |
| TRIAL | 5K | 4K | 3K | 2K | 1K | .5K | 0 | 5K | 4K | 3K | 2K | 1K | .5K | 0 |
| 1 | 1 | 2 | 3 | 4 | 5 | 7 | 11 | 1 | 2 | 3 | 4 | 5 | 7 | 15(.1K) |
| 2 | 1 | 2 | 3 | 4 | 5 | 6 | 18 | 1 | 2 | 3 | 4 | 5 | 7 | 15 |
| 3 | 1 | 2 | 3 | 4 | 5 | 15(.1K) | | 1 | 2 | 3 | 4 | 5 | 7 | 14 |
| 4 | 1 | 2 | 3 | 4 | 5 | 16(.1K) | | 1 | 2 | 3 | 4 | 5 | 7 | 13(.2K) |

TABLE 2

| | CURING AT 175° C. FOR 20 MINUTES | | | | | | | | | | | | | |
|---|---|---|---|---|---|---|---|---|---|---|---|---|---|---|
| | ON | | | | | | | OFF | | | | | | |
| TRIAL | 5K | 4K | 3K | 2K | 1K | .5K | 0 | 5K | 4K | 3K | 2K | 1K | .5K | 0 |
| 1 | 1 | 2 | 3 | 4 | 5 | 6 | 13(.1K) | 1 | 2 | 3 | 4 | 5 | 7 | 17(.1K) |
| 2 | 1 | 2 | 3 | 4 | 5 | 6 | 13(.2K) | 2 | 3 | 4 | 5 | 6 | 9 | 21(.1K) |
| 3 | 1 | 2 | 3 | 4 | 5 | 7 | 17 | 1 | 2 | 3 | 4 | 5 | 7 | 18 |
| 4 | 1 | 2 | 3 | 4 | 5 | 7 | 199(.1K) | 1 | 2 | 3 | 4 | 5 | 7 | 15 |

TABLE 3

| | CURING AT 200° C. FOR 20 MINUTES | | | | | | | | | | | | | |
|---|---|---|---|---|---|---|---|---|---|---|---|---|---|---|
| | ON | | | | | | | OFF | | | | | | |
| TRIAL | 5K | 4K | 3K | 2K | 1K | .5K | 0 | 5K | 4K | 3K | 2K | 1K | .5K | 0 |
| 1 | 10 | 12 | 16 | 21 | 31 | 41 | 65(.1K) | 11 | 14 | 18 | 25 | 39 | 57 | 100(.2K) |
| 2 | 10 | 12 | 16 | 21 | 32 | 44 | 80(.1K) | 12 | 15 | 20 | 27 | 43 | 64 | 90(.2K) |
| 3 | 10 | 12 | 16 | 22 | 33 | 44 | 80(.1K) | 13 | 16 | 22 | 29 | 45 | 67 | 130(.2K) |
| 4 | 10 | 13 | 17 | 23 | 34 | 47 | 85(.1K) | 13 | 16 | 22 | 28 | 44 | 67 | 130(.2K) |

TABLE 4

| | CURING AT 225° C. FOR 20 MINUTES | | | | | | | | | | | | | |
|---|---|---|---|---|---|---|---|---|---|---|---|---|---|---|
| | ON | | | | | | | OFF | | | | | | |
| TRIAL | 5K | 4K | 3K | 2K | 1K | .5K | 0 | 5K | 4K | 3K | 2K | 1K | .5K | 0 |
| 1 | 1 | 2 | 3 | 4 | 5 | 6 | 15 | 2 | 3 | 4 | 5 | 6 | 10 | 40(.1K) |
| 2 | 1 | 2 | 3 | 4 | 5 | 7 | 15 | 2 | 3 | 4 | 5 | 6 | 10 | 37(.1K) |
| 3 | 1 | 2 | 3 | 4 | 5 | 6 | 15(.1K) | 2 | 3 | 4 | 5 | 6 | 9 | 26(.1K) |
| 4 | 1 | 2 | 3 | 4 | 5 | 6 | 25(.1K) | 2 | 3 | 4 | 5 | 6 | 9 | 22(.1K) |

It can readily be seen that the silane coating of the invention provides exceptional antistatic properties.

EXAMPLE 2

Several solutions of tetrathoxylsilane in ethyl alcohol were prepared. The solutions had 3% of tetraethoxylsilane and various levels of hydrochloric acid as indicted in the headings of Tables 5 through 9 hereinbelow. CRT's were coated with the solutions and the antistatic properties were measured as described in Example 1. The results are set forth in Tables 5-9.

TABLE 5

| | 3 WT % HCl - CURING AT 125° C. FOR 20 MINUTES | | | | | | | | | | | | | |
|---|---|---|---|---|---|---|---|---|---|---|---|---|---|---|
| | ON | | | | | | | OFF | | | | | | |
| TRIAL | 5K | 4K | 3K | 2K | 1K | .5K | 0 | 5K | 4K | 3K | 2K | 1K | .5K | 0 |
| 1 | 4 | 5 | 7 | 10 | 15 | 21 | 29 | 4 | 5 | 7 | 10 | 17 | 29 | 60(.2K) |
| 2 | 4 | 5 | 7 | 9 | 14 | 20 | 30 | 4 | 5 | 7 | 10 | 16 | 28 | 60(.2K) |

TABLE 5-continued

3 WT % HCl - CURING AT 125° C. FOR 20 MINUTES

| TRIAL | ON | | | | | | | OFF | | | | | | |
|---|---|---|---|---|---|---|---|---|---|---|---|---|---|---|
| | 5K | 4K | 3K | 2K | 1K | .5K | 0 | 5K | 4K | 3K | 2K | 1K | .5K | 0 |
| 3 | 4 | 5 | 7 | 9 | 14 | 20 | 28 | 4 | 5 | 7 | 10 | 19 | 45 | 90(.3K) |
| 4 | 4 | 5 | 7 | 9 | 14 | 20 | 28 | 4 | 5 | 7 | 9 | 15 | 24 | 57(.1K) |

TABLE 6

6 WT % HCl - CURING AT 125° C. FOR 20 MINUTES

| TRIAL | ON | | | | | | | OFF | | | | | | |
|---|---|---|---|---|---|---|---|---|---|---|---|---|---|---|
| | 5K | 4K | 3K | 2K | 1K | .5K | 0 | 5K | 4K | 3K | 2K | 1K | .5K | 0 |
| 1 | 13 | 17 | 21 | 28 | 42 | 60 | 46(.3K) | 17 | 20 | 25 | 33 | 50 | 72 | 118(.2K) |
| 2 | 13 | 16 | 21 | 28 | 41 | 57 | 120(.2K) | 17 | 20 | 26 | 34 | 51 | 80 | 150(.2K) |
| 3 | 13 | 16 | 20 | 27 | 40 | 58 | 115(.2K) | 17 | 20 | 25 | 33 | 52 | 84 | 165(.2K) |
| 4 | 12 | 15 | 20 | 26 | 40 | 54 | 85(.2K) | 17 | 20 | 25 | 34 | 55 | 95 | 180(.3K) |

TABLE 7

9 WT % HCl - CURING AT 125° C. FOR 20 MINUTES

| TRIAL | ON | | | | | | | OFF | | | | | | |
|---|---|---|---|---|---|---|---|---|---|---|---|---|---|---|
| | 5K | 4K | 3K | 2K | 1K | .5K | 0 | 5K | 4K | 3K | 2K | 1K | .5K | 0 |
| 1 | | | | | | 1 | 3 | | | | | 1 | 2 | 12 |
| 2 | | | | | | 1 | 5 | | | | | 1 | 2 | 7 |
| 3 | | | | | | 1 | 4 | | | | | | 1 | 4 |
| 4 | | | | | 1 | 2 | 3 | | | | | 1 | 3 | 10(.2K) |

TABLE 8

12 WT % HCl - CURING AT 125° C. FOR 20 MINUTES

| TRIAL | ON | | | | | | | OFF | | | | | | |
|---|---|---|---|---|---|---|---|---|---|---|---|---|---|---|
| | 5K | 4K | 3K | 2K | 1K | .5K | 0 | 5K | 4K | 3K | 2K | 1K | .5K | 0 |
| 1 | | | 1 | 2 | 3 | 4 | 8 | 1 | | 2 | 3 | 4 | 5 | 19(.1K) |
| 2 | | | 1 | 2 | 3 | 4 | 8 | 1 | | 2 | 3 | 4 | 5 | 19(.1K) |
| 3 | | | 1 | 2 | 3 | 4 | 6 | 1 | | 2 | 3 | 4 | 5 | 40(.1K) |
| 4 | | | 1 | 2 | 3 | 4 | 7 | 1 | | 2 | 3 | 4 | 5 | 22(.1K) |

TABLE 9

15 WT % HCl - CURING AT 125° C. FOR 20 MINUTES

| TRIAL | ON | | | | | | | OFF | | | | | | |
|---|---|---|---|---|---|---|---|---|---|---|---|---|---|---|
| | 5K | 4K | 3K | 2K | 1K | .5K | 0 | 5K | 4K | 3K | 2K | 1K | .5K | 0 |
| 1 | | | 1 | 2 | 3 | 4 | 7 | 1 | | | 2 | 3 | 5 | 17(.2K) |
| 2 | | | 1 | 2 | 3 | 4 | 6 | 1 | | | 2 | 3 | 4 | 11(.2K) |
| 3 | | | 1 | 2 | 3 | 4 | 8 | 1 | | 2 | 3 | 4 | 5 | 10(.2K) |
| 4 | | | 1 | 2 | 3 | 4 | 8 | 1 | | 2 | 3 | 4 | 5 | 15(.1K) |

EXAMPLE 3

Several 3% solutions of tetraethoxylsilane in alcohol were prepared and used to coat CRT's as previously described. These solutions had various levels of nitric acid added thereto. The results of antistatic test measurements are reported below in Tables 10-13.

The antistatic properties provided by use of chloride ion in combination with silane are excellent. In contrast, nitric acid (nitrate ion) provide coatings with poor antistatic properties.

TABLE 10

3 WT % NITRIC ACID - CURING AT 125° C. FOR 20 MINUTES

| TRIAL | ON | | | | | | | OFF | | | | | | |
|---|---|---|---|---|---|---|---|---|---|---|---|---|---|---|
| | 5K | 4K | 3K | 2K | 1K | .5K | 0 | 5K | 4K | 3K | 2K | 1K | .5K | 0 |
| 1 | 112 | 144 | 194 | 282 | 300(1.4K) | — | — | 166 | 210 | 275 | 300(2.8K) | — | — | — |
| 2 | 120 | 156 | 215 | 300(2.2K) | — | — | — | 155 | 198 | 265 | 300(1.5K) | — | — | — |
| 3 | 122 | 164 | 230 | 300(2.5K) | — | — | — | 150 | 192 | 255 | 300(2.5K) | — | — | — |
| 4 | 126 | 168 | 245 | 300(2.6K) | — | — | — | 158 | 203 | 274 | 300(2.8K) | — | — | — |

TABLE 11

9 WT % NITRIC ACID - CURING AT 125° C. FOR 20 MINUTES

| TRIAL | ON | | | | | | | OFF | | | | | | |
|---|---|---|---|---|---|---|---|---|---|---|---|---|---|---|
| | 5K | 4K | 3K | 2K | 1K | .5K | 0 | 5K | 4K | 3K | 2K | 1K | .5K | 0 |
| 1 | 25 | 30 | 36 | 48 | 67 | 100 | 180(.4K) | 27 | 33 | 40 | 51 | 75 | 114 | 230(.2K) |

TABLE 11-continued

| | 9 WT % NITRIC ACID - CURING AT 125° C. FOR 20 MINUTES | | | | | | | | | | | | | |
|---|---|---|---|---|---|---|---|---|---|---|---|---|---|---|
| | ON | | | | | | | OFF | | | | | | |
| TRIAL | 5K | 4K | 3K | 2K | 1K | .5K | 0 | 5K | 4K | 3K | 2K | 1K | .5K | 0 |
| 2 | 24 | 28 | 34 | 43 | 59 | 76 | 125(.1K) | 28 | 33 | 40 | 53 | 79 | 125 | 200(.1K) |
| 3 | 24 | 39 | 35 | 45 | 62 | 80 | 113(.2K) | 28 | 33 | 41 | 54 | 81 | 135 | 195(.3K) |
| 4 | 23 | 28 | 34 | 43 | 60 | 79 | 135(.1K) | 28 | 33 | 41 | 54 | 82 | 136 | 175(.4K) |

TABLE 12

| | 12 WT % NITRIC ACID - CURING AT 125° C. FOR 20 MINUTES | | | | | | | | | | | | | |
|---|---|---|---|---|---|---|---|---|---|---|---|---|---|---|
| | ON | | | | | | | OFF | | | | | | |
| TRIAL | 5K | 4K | 3K | 2K | 1K | .5K | 0 | 5K | 4K | 3K | 2K | 1K | .5K | 0 |
| 1 | 31 | 36 | 44 | 57 | 80 | 118 | 180(.4K) | 34 | 41 | 50 | 63 | 90 | 129 | 225(.2K) |
| 2 | 28 | 34 | 41 | 52 | 70 | 89 | 120(.2K) | 35 | 42 | 51 | 65 | 95 | 141 | 240(.3K) |
| 3 | 27 | 33 | 40 | 50 | 68 | 86 | 135(.1K) | 36 | 42 | 52 | 66 | 102 | 151 | 240(.3K) |
| 4 | 28 | 34 | 41 | 52 | 70 | 90 | 160(.1K) | 36 | 42 | 52 | 66 | 102 | 151 | 240(.3K) |

TABLE 13

| | 15 WT % NITRIC ACID - CURING AT 125° C. FOR 20 MINUTES | | | | | | | | | | | | | |
|---|---|---|---|---|---|---|---|---|---|---|---|---|---|---|
| | ON | | | | | | | OFF | | | | | | |
| TRIAL | 5K | 4K | 3K | 2K | 1K | .5K | 0 | 5K | 4K | 3K | 2K | 1K | .5K | 0 |
| 1 | 3 | 4 | 5 | 6 | 8 | 10 | 20 | 4 | 5 | 6 | 7 | 10 | 15 | 34(.2K) |
| 2 | 3 | 4 | 5 | 6 | 8 | 10 | 22 | 3 | 4 | 5 | 7 | 10 | 14 | 27(.2K) |
| 3 | 3 | 4 | 5 | 6 | 7 | 10 | 19 | 3 | 4 | 5 | 7 | 10 | 16 | 50(.2K) |
| 4 | 3 | 4 | 5 | 6 | 7 | 10 | 20 | 3 | 4 | 5 | 7 | 10 | 16 | 30(.1K) |

From the foregoing examples with nitric acid and acetic acid, it is apparent that the improved antistatic properties provided by the use of hydrochloric acid and water are not related to reducing the Ph with an acid. While not wishing to be bound by any theory, it is believed that the chloride ion is highly hygroscopic and interacts with moisture from ambient air on the surface of the CRT to provide reduced antistatic properties.

What is claimed is:

1. A method for improving the antistatic and antiglare properties of the surface of a cathode ray tube comprising:
   (a) providing a solution consisting essentially of a silane selected from the group consisting of chlorinated silanes and alkoxysilanes and an alcohol,
   (b) spraying droplets of said solution onto the surface of a cathode ray tube, and
   (c) curing said silane in the presence of chloride ion provided by said solution on said cathode ray tube in a curing step for a period of time sufficient to convert said silane to siloxane on the surface of said cathode ray tube, said chloride ion being present in said solution at a level of from about 0.01 to about 1.3 mols of chloride ion per 100 grams of solution.

2. A method in accordance with claim 1 wherein said surface of said cathode ray tube is preheated prior to application of said solution.

3. A method in accordance with claim 2 wherein said cathode ray tube is preheated to a temperature in the range of from about 70° C. to about 120° C. prior to applying said solution.

4. A method in accordance with claim 1 wherein said curing of said cathode ray tube is at an elevated temperature of from ambient to about 200° C. for a period of from about 0.1 hour to about 2 hours.

5. A method in accordance with claim 1 wherein said silane is present on the surface of said cathode ray tube at a level of from about 0.3 to 1.2 milligrams per square centimeter of said surface area of said cathode ray tube.

6. A method in accordance with claim 1 wherein said solution is applied by spraying a fine mist of said solution onto said surface.

7. A method in accordance with claim 1 wherein said solution is applied to said surface of said cathode ray tube by multiple spray passes.

8. A method in accordance with claim 7 wherein from 3 to 12 spray passes are used to apply said solution.

9. A method in accordance with claim 1 wherein said silane is present in said solution at a level of from about 0.5 percent to about 50 percent, based on the weight of said solution.

10. A method in accordance with claim 1 wherein said silane is tetraethoxysilane.

11. A method in accordance with claim 1 wherein said silane is tetrachlorosilane and said chloride ion is provided by decomposition of said silane.

12. A method in accordance with claim 1 wherein hydrochloric acid is present in said solution at a level sufficient to provide form about 0.01 to about 1.3 mols of chloride ion per 100 grams of solution.

13. A method in accordance with claim 1 wherein said alcohol is a $C_1$–$C_4$ aliphatic alcohol.

14. A method in accordance with claim 13 wherein said alcohol is ethanol.

15. A method in accordance with claim 13 wherein said alcohol is propanol.

16. A method in accordance with claim 1 wherein said solution droplets have a diameter of from about 0.3 to about 0.5 microns.

17. A method in accordance with claim 1 wherein said silane is tetrachlorosilane which is present in said solution at a level of from about 0.5% to about 50%, based on the weight of said solution, and hydrochloric acid is present at a level of from about 1% to about 15% and said alcohol provides the balance of said solution.

18. A cathode ray tube having a surface with reduced gloss and improved antistatic properties comprising a cathode ray tube having a coating on the surface thereof, said coating being provided by spraying fine droplets of a solution consisting essentially of a silane selected from the group consisting of chlorinated silane and an alkoxysilane and an alcohol onto the surface of said CRT and curing the silane for a period of time sufficient to covert said silane in the presence of chloride ion provided by said solution to a siloxane coating on the surface of said cathode ray tube, said siloxane coating having a uniform, fine texture, said chloride ion being present in said solution at a level of from about 0.1 to about 1.3 mols of chloride ion per 100 grams of solution.

19. A cathode ray tube in accordance with claim 18 wherein said surface of said cathode ray tube is preheated prior to application of said solution.

20. A cathode ray tube in accordance with claim 18 wherein said cathode ray tube is preheated to a temperature in the range of from about 70° C. to about 120° C. prior to applying said solution.

21. A cathode ray tube in accordance with claim 18 wherein said curing of said cathode ray tube is at an elevated temperature of rom ambient to about 200° C. for a period of from about 0.1 hour to about 2 hours.

22. A cathode ray tube in accordance with claim 18 wherein said silane is present on the surface of said cathode ray tube at a level of from about 0.3 to about 1.2 milligrams per square centimeter of said surface area of said cathode ray tube.

23. A cathode ray tube in accordance with claim 18 wherein said solution is applied by spraying a fine mist of said solution onto said surface.

24. A cathode ray tube in accordance with claim 18 wherein said solution is applied to said surface of said cathode ray tube by multiple spray passes.

25. A cathode ray tube in accordance with claim 24 wherein from 3 to 12 spray passes are used to apply said solution.

26. A cathode ray tube in accordance with claim 18 wherein said silane is present in said solution at a level of from about 0.5% to about 50%, based on the weight of said solution.

27. A cathode ray tube in accordance with claim 18 wherein said silane is tetraethoxysilane.

28. A cathode ray tube in accordance with claim 18 wherein said silane is tetrachlorosilane and said chloride ion is provided by decomposition of said silane.

29. A cathode ray tube in accordance with claim 18 wherein hydrochloric acid is present in said solution at a level sufficient to provide from about 0.01 to about 1.3 mols of chloride ion per 100 grams of solution.

30. A cathode ray tube in accordance with claim 18 wherein said alcohol is a $Cp_1$-$C_4$ aliphatic alcohol.

31. A cathode ray tube in accordance with claim 30 wherein said alcohol is ethanol.

32. A cathode ray tube in accordance with claim 30 wherein said alcohol is propanol.

33. A cathode ray tube in accordance with claim 18 wherein said solution droplets have a diameter of from about 0.3 to about 0.5 microns.

34. A cathode ray tube in accordance with claim 18 wherein said silane is tetrachlorosilane which is present in said solution at a level of from about 0.5% to about 50%, based on the weight of said solution, and hydrochloric acid is present at a level of from about 1% to about 15% and said alcohol provides the balance of said solution.

* * * * *